(No Model.)
4 Sheets—Sheet 1.
H. H. TAYLOR.
CAPSULE MACHINE.
No. 276,094.  Patented Apr. 17, 1883.
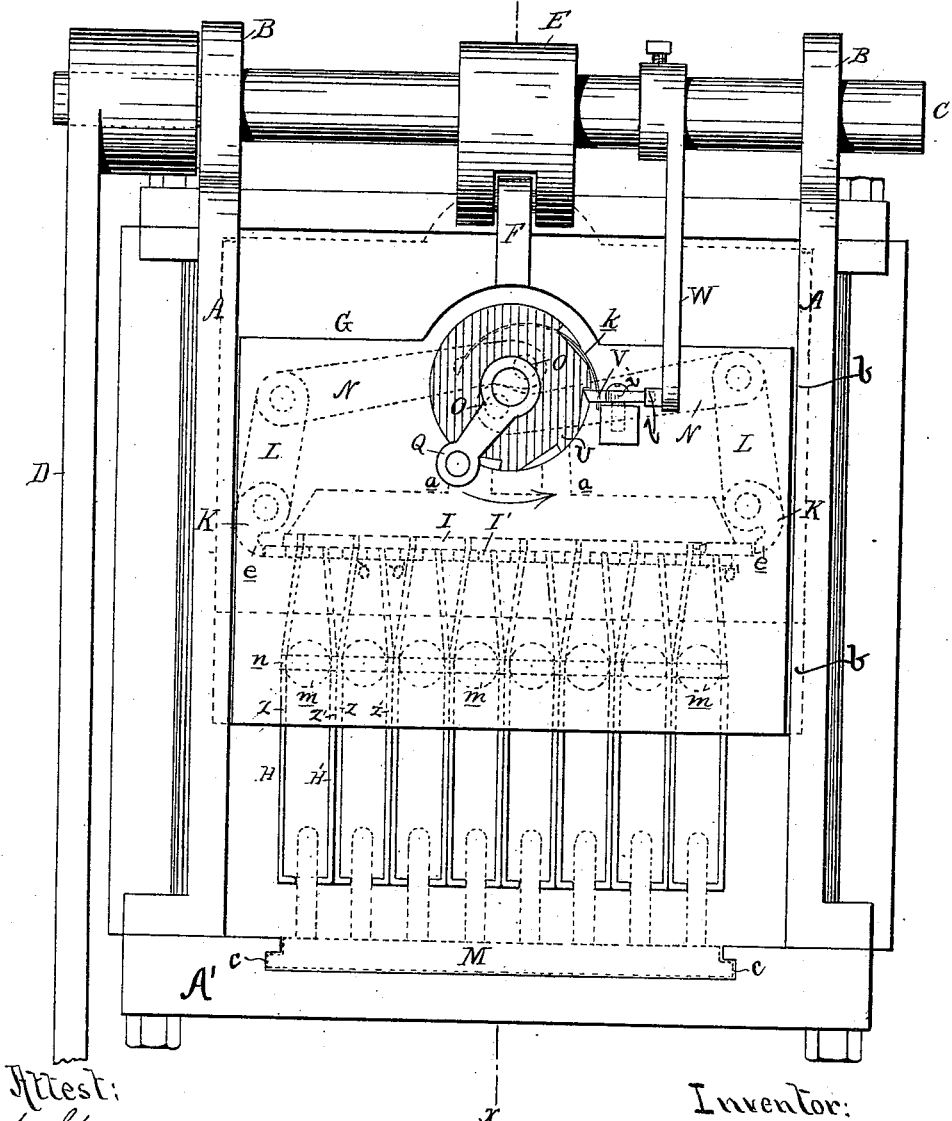
Attest:
H. J. Sprague
E. Scully
Inventor:
Harrison H. Taylor.
By Thos. S. Sprague
Att'y.
N. PETERS. Photo-Lithographer, Washington, D. C.

(No Model.)
4 Sheets—Sheet 2.
H. H. TAYLOR.
CAPSULE MACHINE.
No. 276,094.
Patented Apr. 17, 1883.
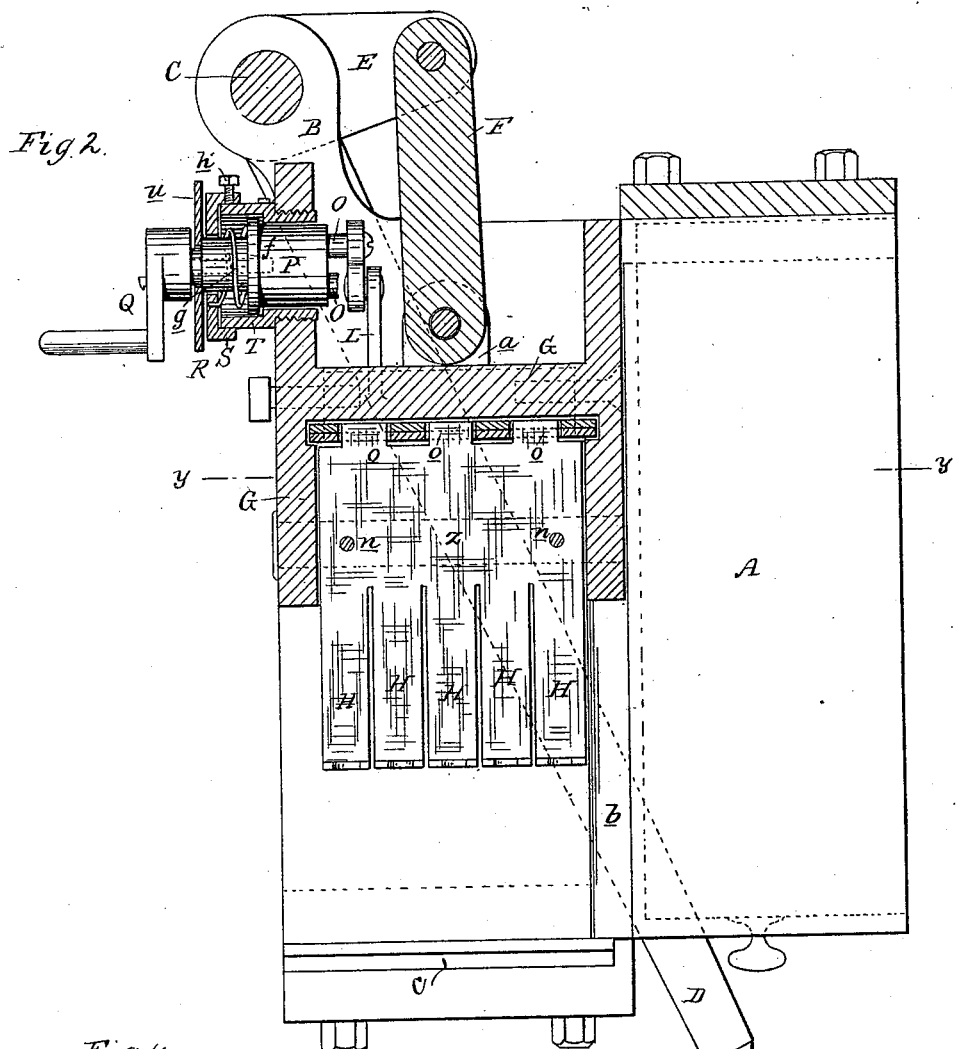
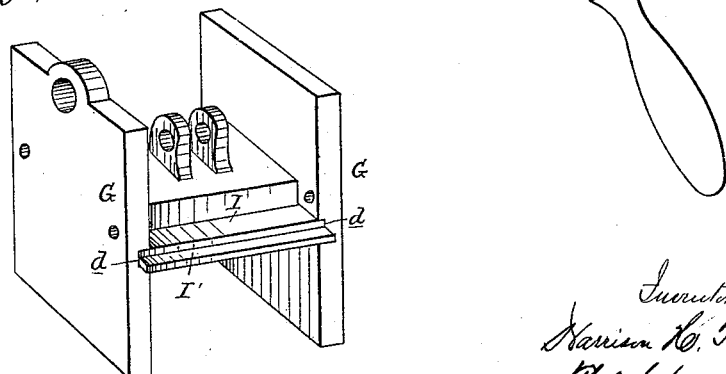

(No Model.)

4 Sheets—Sheet 3.

H. H. TAYLOR.
CAPSULE MACHINE.

No. 276,094.          Patented Apr. 17, 1883.

Attest:
H. Sprague
E. Scully

Inventor:
Harrison H. Taylor
By Thos. S. Sprague
Atty.

(No Model.) H. H. TAYLOR. 4 Sheets—Sheet 4.
CAPSULE MACHINE.
No. 276,094. Patented Apr. 17, 1883.
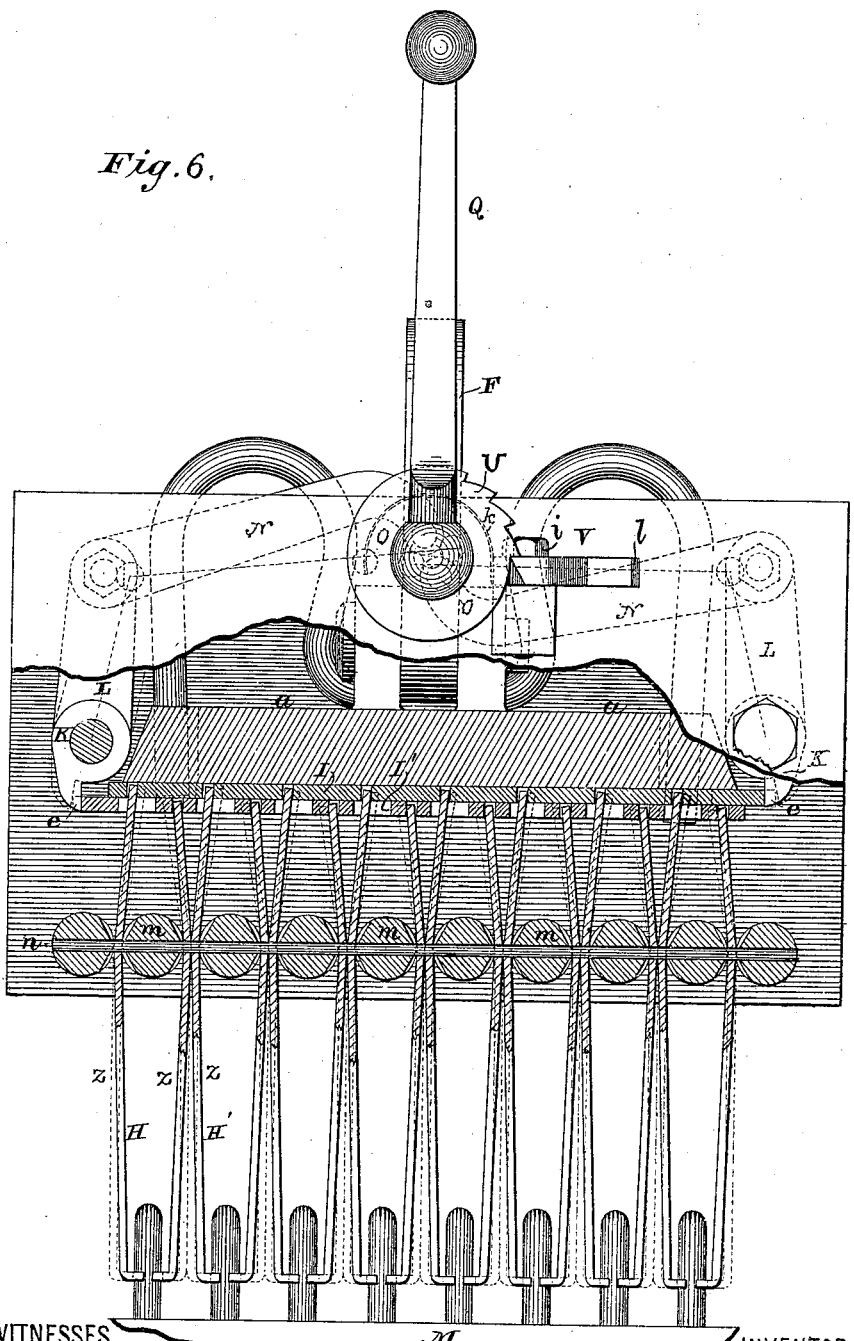
WITNESSES
Wm A. Skinkle
F. D. Shoemaker
INVENTOR
Harrison H. Taylor.
By his Attorney
T. W. Robertson

UNITED STATES PATENT OFFICE.

HARRISON H. TAYLOR, OF DETROIT, MICHIGAN, ASSIGNOR TO FRED. A. HUBEL, OF SAME PLACE.

CAPSULE-MACHINE.

SPECIFICATION forming part of Letters Patent No. 276,094, dated April 17, 1883.

Application filed April 13, 1882. (No model.)

*To all whom it may concern:*

Be it known that I, HARRISON H. TAYLOR, of Detroit, in the county of Wayne and State of Michigan, have invented new and useful Improvements in Machines for Removing Capsules from Molds; and I do hereby declare that the following is a full, clear, and exact description thereof, reference being had to the accompanying drawings, which form a part of this specification.

The nature of my invention relates to certain new and useful improvements in machines for removing capsules from molds; and the invention consists in the peculiar construction of parts, and their combinations and operation, whereby gelatine capsules are safely and readily removed from the molds or formers, such as are described in Reissued Letters Patent No. 8,440, to Frederick A. Hubel, and bearing date October 1, 1878, as more fully hereinafter described, and specifically pointed out in the claims.

Figure 3:
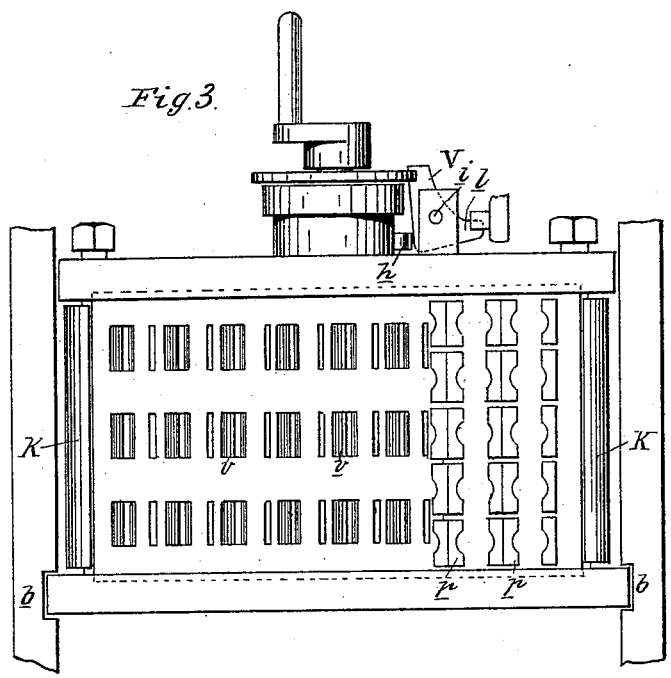
Figure 5:
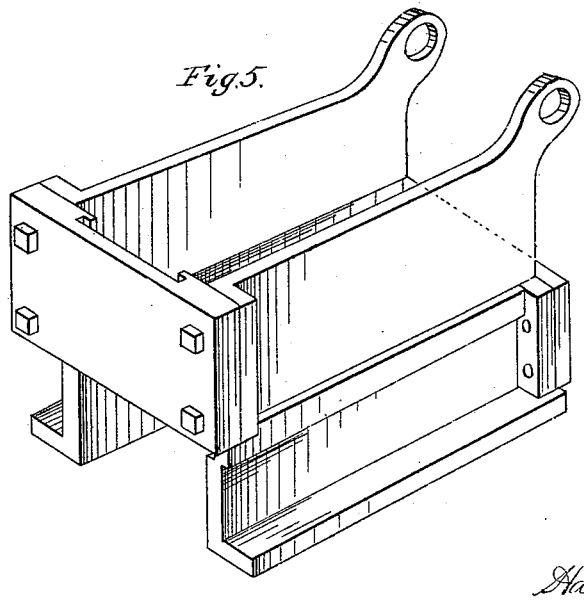

Figure 1 is a top plan view of my machine, showing the spring-clutches in proper positions ready to be closed upon the molds, which are shown in dotted outlines, and attached to a removable plate. Fig. 2 is a vertical central section on the line $xx$ in Fig. 1, with the spring-clutches shown in a retracted position. Fig. 3 is an elevation of the reciprocating head to which the spring-clutches are attached, the greater portion of said spring-clutches being broken away so as to disclose the sliding plates by means of which said clutches are opened and closed. Fig. 4 is a diagram perspective of the head, showing also the shifting plates; but all other parts attached thereto are removed. Fig. 5 is a diagram perspective of the frame of my machine. Fig. 6 is a detail plan view of the moving head, showing the spring-clutches closed upon the molds, and indicating in dotted lines the operation of the several parts.

In the acompanying drawings, A represents the frame of my machine, which, at the rear end, is provided with suitable bearings, B, to receive the transverse shaft C, to which the operating-lever D is attached at one end, and midway between the bearings is secured the crank E, which connects at its free end with a link, F, the other end of which is attached to the reciprocating head G by means of the ears $a$. The head G is thus adapted to receive a reciprocating motion, by means of the connections just described, between the sides of the frame A, which contains the grooves $b$ on each side for properly guiding said head in its movements. The front portion, A', of the frame contains in the inside suitable grooves or guides, $c$, for the purpose of holding the mold-plate M in position, as shown in Figs. 1 and 2. The reciprocating head G (shown in perspective in Fig. 4) has attached to it the spring-clutches H H, the construction of which, together with the devices for operating the same, I will now explain.

I I' (see Fig. 4) are two plates held and guided by the grooves $d\,d$ in the head G. These plates are adapted to be shifted within the grooves independently of each other by the following-described devices:

K K are two rock-shafts, provided at their under side with projecting lips $e\,e$. The lip of one rock-shaft engages with the free end of the plate I, and the lip of the other with the free end of the other plate, I'.

L L are crank-arms attached to the rock-shafts K K.

N N are links pivotally connected to the crank-arms L at one end, and at the other to the pins O O, projecting from the inner end of the shaft P. This shaft (see Fig. 2) passes through the top part of the head G, and is provided at its upper end with a crank-handle, Q, by means of which the shaft P can be rotated.

R is a coil-spring, one end of which is secured to the shaft P at $f$, and the other end is secured at $g$ to the cover S, which can be adjustably secured, by means of the set-screw $h$, upon the stationary hollow cylinder T, which latter surrounds a portion of the shaft P, and also incloses the spring R. The cylinder T, with head S and set-screw $h$, forms together a combination for the adjustment of the spring R to any desired tension.

U is a ratchet-wheel secured upon the shaft P. A dog, V, pivoted at $i$, engages with the ratchet-wheel U, being forced into such engagement by the spring $k$, except when the end $l$ of the dog is forcibly depressed by the arm or tappet W, which is secured upon the shaft C.

Z Z' are a number of spring-plates, all arranged parallel and in pairs, as shown. The plates Z and Z', forming a pair, have a round bolt, m, pass between them, and are held in place upon these bolts by the lateral bolts n n. The rear ends of the plates Z Z' terminate in tongues o o. The tongues of the plates Z are stepped into the plate I, while the tongues o' of the plates Z' are stepped into the plate I'. The forward ends of these plates are slitted, so as to form the spring-clutches H H'. The free ends of these spring-clutches are bent at right angles, and properly cut away, as at p, to adapt them to embrace a round mold or former-pin.

In practice the mold M, which is to be stripped of its capsules, is inserted into its proper place, as shown, and then the lever D is raised to the proper height, so as to advance the head G far enough to bring the free ends p of the spring-clutches into proper position for stripping. The operator then, with his free hand, turns the shaft P by means of the crank-handle Q in the direction of the arrow. This movement, by means of the connections hereinbefore described, shifts the plates I I' in opposite directions, and as the plates Z Z' are respectively stepped in said plates I I' the movement will force the plates Z Z' to close upon each other at their free ends, like clutches, and, as shown in dotted lines in Fig. 1, for one pair of the plates Z Z'. Each pair of clutches H H' will embrace its individual former, and if the lever D is then lowered the head G will retract the parts. The clutches, following the retracting head, will strip the capsules from the molds. As soon as the lever D has reached its lowest position the arm W upon the shaft C will release the dog V from engagement with the ratchet, and the shaft P, forced thereto by the coil-spring R, will resume its former position and allow the plates I I' to also resume their original position, with the clutches H H' open and ready to be advanced again upon another mold. The capsules thus stripped from the mold will be collected in a suitable drawer located beneath the frame, or in any other desired receptacle.

The object of slitting the plates Z Z' so as to form the individual pairs of clutches H H' is that these latter will more readily adjust themselves to slight irregularities in the spacing of the molds or adjustment of the different parts. In order to allow the plate I to operate the spring-plate Z without interfering with the operation of its fellow plate I', proper slots, r, are cut in this plate I', which prevent the tongues o of the spring-plates Z, which are stepped in the plate I, from interfering with the movement.

What I claim as my invention is—

1. In a capsule-stripping machine, the shifting plates I I' and suitable mechanism for moving the same in opposite directions, in combination with the spring-clutches Z Z' and fulcrum-pins m, substantially as shown and described.

2. In a capsule-stripping machine, the head G, provided with a series of parallel plates, Z Z', arranged in pairs, each pair having a stationary fulcrum, upon which they are held in position and adapted to alternately open and close, substantially as and for the purposes specified.

3. In a capsule-stripping machine, and in combination with mechanism for reciprocating the head G, the arm W, for automatically tripping the dog V, which releases the mechanism for closing the spring-cluctches, substantially as set forth.

4. In a capsule-stripping machine, the combination of the shaft P, pins o o, links N, crank L, rock-shafts K, and lips e, with the shifting plates I I' and suitable spring-clutches, arranged and operating substantially as described.

5. In a capsule-stripping machine, the combination of a stationary frame in which the molds to be stripped are secured, a reciprocating head actuated by a hand-lever, a series of spring-clutches attached to said reciprocating head and actuated by suitable mechanism for closing the same upon the molds, and an automatic tripping device for opening said clutches after the stripping of the molds is performed, the parts constructed, arranged, and operating substantially as and for the purposes specified.

HARRISON H. TAYLOR.

Witnesses:
  H. S. SPRAGUE,
  E. SCULLY.